(12) United States Patent
Kanzaki

(10) Patent No.: US 11,407,188 B2
(45) Date of Patent: Aug. 9, 2022

(54) MANUFACTURING METHOD OF PLASTIC LENS

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 279 days.

(21) Appl. No.: 16/626,880

(22) PCT Filed: Jun. 11, 2018

(86) PCT No.: PCT/JP2018/022175
§ 371 (c)(1),
(2) Date: Dec. 27, 2019

(87) PCT Pub. No.: WO2019/003879
PCT Pub. Date: Jan. 3, 2019

(65) Prior Publication Data
US 2020/0223164 A1     Jul. 16, 2020

(30) Foreign Application Priority Data
Jun. 29, 2017   (JP) .............................. JP2017-127193

(51) Int. Cl.
*B29D 11/00*     (2006.01)
*B29C 45/40*     (2006.01)
(Continued)

(52) U.S. Cl.
CPC ...... *B29D 11/00019* (2013.01); *B29C 45/401* (2013.01); *B29D 11/0048* (2013.01);
(Continued)

(58) Field of Classification Search
CPC .......... B29D 11/00019; B29D 11/0048; B29C 45/401; G02B 7/025; G02B 13/18
See application file for complete search history.

(56) References Cited

U.S. PATENT DOCUMENTS

2013/0265660 A1    10/2013   Yoshida et al.

FOREIGN PATENT DOCUMENTS

| CN | 101259740 | 9/2008 |
| CN | 101909842 | 12/2010 |

(Continued)

OTHER PUBLICATIONS

"International Search Report (Form PCT/ISA/210) of PCT/JP2018/022175," dated Aug. 14, 2018, with English translation thereof, pp. 1-3.

(Continued)

*Primary Examiner* — Mathieu D Vargot
(74) *Attorney, Agent, or Firm* — JCIPRNET

(57) ABSTRACT

A manufacturing method of a plastic lens formed by using a metal mold having a fixed mold and a movable mold. The plastic lens comprises a flange part surrounding a lens face, and an image side face of the flange part comprises a black coating part and an outer peripheral part. The manufacturing method may include a molding process in which the plastic lens is molded by using the fixed mold for molding an object side lens face and the movable mold for molding an image side lens face and the flange part, a mold opening process in which the metal mold is opened by moving the movable mold, and a pushing-out process in which the outer peripheral part is pushed out by an ejector pin disposed in the movable mold when the mold opening process is performed or, after the mold opening process has been performed.

6 Claims, 9 Drawing Sheets

(51) Int. Cl.
*G02B 7/02* (2021.01)
*G02B 13/18* (2006.01)
*B29L 11/00* (2006.01)

(52) U.S. Cl.
CPC ............. *G02B 7/025* (2013.01); *G02B 13/18* (2013.01); *B29K 2905/00* (2013.01); *B29L 2011/0016* (2013.01)

(56) References Cited

FOREIGN PATENT DOCUMENTS

| CN | 101980848 | 2/2011 |
|---|---|---|
| CN | 102164728 | 8/2011 |
| CN | 104919341 | 9/2015 |
| CN | 105074527 | 11/2015 |
| CN | 106166822 | 11/2016 |
| JP | 2002160256 | 6/2002 |
| JP | 2003202411 | 7/2003 |
| JP | 2010089398 | 4/2010 |
| JP | 2010221516 | 10/2010 |
| JP | 2010269532 | 12/2010 |
| JP | 4992105 | 8/2012 |
| JP | 2013205808 | 10/2013 |
| JP | 2016191808 | 11/2016 |
| JP | 2016191809 | 11/2016 |
| WO | 2014050602 | 4/2014 |

OTHER PUBLICATIONS

"Office Action of China Counterpart Application", dated Apr. 14, 2021, with English translation thereof, p. 1 -p. 11.

MANUFACTURING METHOD OF PLASTIC LENS

CROSS-REFERENCE TO RELATED APPLICATION

This application is a 371 application of the international PCT application serial no. PCT/JP2018/022175, filed on Jun. 11, 2018, which claims the priority benefits of Japan application no. 2017-127193, filed on Jun. 29, 2017. The entirety of the above-mentioned patent application is hereby incorporated by reference herein and made a part of this specification.

BACKGROUND

Technical Field

The present invention relates to a manufacturing method of a plastic lens which is used in a lens unit including a plurality of lenses and a lens-barrel holding the lenses and is press-fitted to the lens-barrel.

Description of Related Art

In a lens unit, a configuration may be adopted that a light shielding film (light shielding layer) is formed on an outer peripheral part which surrounds a lens face on an outer side in a radial direction to prevent incidence and reflection of unnecessary light (see, for example, Patent Literatures 1 and 2).

In a case that a lens is to be held by a lens barrel, when a flange part is formed in the lens, the lens can be easily held by the lens barrel. Especially, a plastic lens is injection molded by a fixed mold for molding a lens face on one side and a movable mold for molding a lens face on the other side. Therefore, a plastic lens is commonly formed with a flange part. The plastic lens can be press-fitted and fixed to a lens barrel by utilizing the flange part. On the other hand, in a case that a flange part is formed, when unnecessary light incident on the flange part is overlapped with necessary effective light, a ghost or flare may occur.

Therefore, a configuration has been known that black coating as a light shielding film is applied to a flange face of a first lens which is disposed on the most object side. In this case, a second lens and subsequent lenses (on an image side) are also formed with a flange part and thus a ghost and the like may occur by the flange parts of the second lens and the subsequent lenses. However, restraint of occurrence of a ghost and the like caused by the flange parts of the second lens and the subsequent lenses has not been required.

REFERENCE LIST

Patent Literature

Patent Literature 1: Japanese Patent Laid-Open No. 2016-191808
Patent Literature 2: Japanese Patent Laid-Open No. 2016-191809

SUMMARY

Problems to be Solved by the Invention

In a current camera market, demand for an on-vehicle sensing camera and the like is increasing and a further high-performance camera is required. Occurrence of a ghost and the like (ghost occurred at view angles of 85° and 90°) which has not been required to prevent so far is required to be restrained and thus, black coating is required to apply to flange parts of the second lens and the subsequent lenses which are considered to be factors occurring the ghost. In this case, sufficiently high accuracy is required in a manufacturing stage of a plastic lens. In other words, a flange part and black coating of the flange part has been required to take into consideration in manufacturing processes of a plastic lens. More specifically, an injection-molding technique in which distortion can be further reduced at the time of injection molding of a plastic lens has been required, and a technique has been required in which a state of black coating applied to a flange part in a black coating process after injection molding is maintained in an appropriate quality.

In view of the problems described above, an objective of the present invention is to provide a technique which is capable of manufacturing a plastic lens with further reduced distortion and maintaining a state of black coating applied to a flange part in an appropriate quality by taking the flange part and the black coating of the flange part into consideration in manufacturing processes of a plastic lens.

Means to Solve the Problems

The present invention provides a manufacturing method of a plastic lens which is to be press-fitted from an object side of a lens-barrel toward an image side and is held, and the plastic lens is formed by using a metal mold including a fixed mold and a movable mold. The plastic lens is provided with a lens face and a flange part surrounding the lens face, and an image side face of the flange part is provided with a black coating part and an outer peripheral part which is formed on an outer peripheral side with respect to the black coating part. The manufacturing method of the plastic lens includes a plastic lens molding process in which the plastic lens is molded by using the fixed mold for molding an object side lens face of the plastic lens and the movable mold for molding an image side lens face and the flange part of the plastic lens, a mold opening process in which the metal mold is opened by moving the movable mold after the plastic lens molding process, and a pushing-out process in which the outer peripheral part is pushed out by an ejector pin which is disposed in the movable mold at a time when the mold opening process is performed or, after the mold opening process has been performed. Since the outer peripheral part (area which is formed on an outer peripheral side with respect to the black coating part of the flange part) is utilized for taking out a plastic lens from the metal mold, when the plastic lens is to be pushed out from the metal mold and separated from the metal mold by the ejector pin, the plastic lens (especially, lens face) can be restrained from distorting. Further, influence on the black coating can be prevented. For example, a portion which is pushed by the ejector pin is formed with a minute protruded part and thus, when black coating is applied to the outer peripheral part, unevenness or peeling of black coating may occur. However, the outer peripheral part which is a portion pushed by the ejector pin and the black coating part which is a portion applied with black coating are separately provided and thus, occurrence of such malfunction can be prevented.

Further, a boundary between the movable mold and the fixed mold may be set so as to be located on the object side with respect to a portion of the plastic lens which is press-fitted to the lens-barrel. The image side lens face and the flange part are formed by a movable mold of the metal mold. Therefore, the parting line is formed on the object side. The plastic lens is press-fitted from the object side of the lens-barrel toward the image side and thus, even in a case that a minute projected part has been formed in the parting line, malfunction (distortion or axial deviation of the lens) due to the projected part at the time of press-fitting can be restrained.

Further, at least a part of an area of the outer peripheral part where the ejector pin is to be abutted may face an object side face of the flange part in an optical axis direction. An area with which the ejector pin is abutted, in other words, an opposite side to the portion where the ejector pin pushes is not the object side lens face but the object side face of the flange part and thus, adverse influence to the object side lens face can be eliminated.

Further, in the plastic lens molding process, the ejector pin may be set in a state that the ejector pin is disposed on the image side with respect to an image side flange face forming face of an image side flange face forming mold for forming an image side face of the flange part.

Further, it may be configured that the outer peripheral part is provided with a plurality of positioning faces which are protruded to the image side, and the area where the ejector pin is to be abutted is provided between the positioning faces adjacent to each other in the plurality of the positioning faces.

Effects of the Invention

According to the present invention, a technique can be provided which is capable of manufacturing a plastic lens with further reduced distortion and maintaining a state of black coating applied to the flange part in an appropriate quality by taking the flange part and the black coating of the flange part into consideration.

DESCRIPTION OF THE EMBODIMENTS

An embodiment for carrying out the invention (hereinafter, referred to as an "embodiment") will be described below with reference to the accompanying drawings.

First Embodiment

Figure 1:
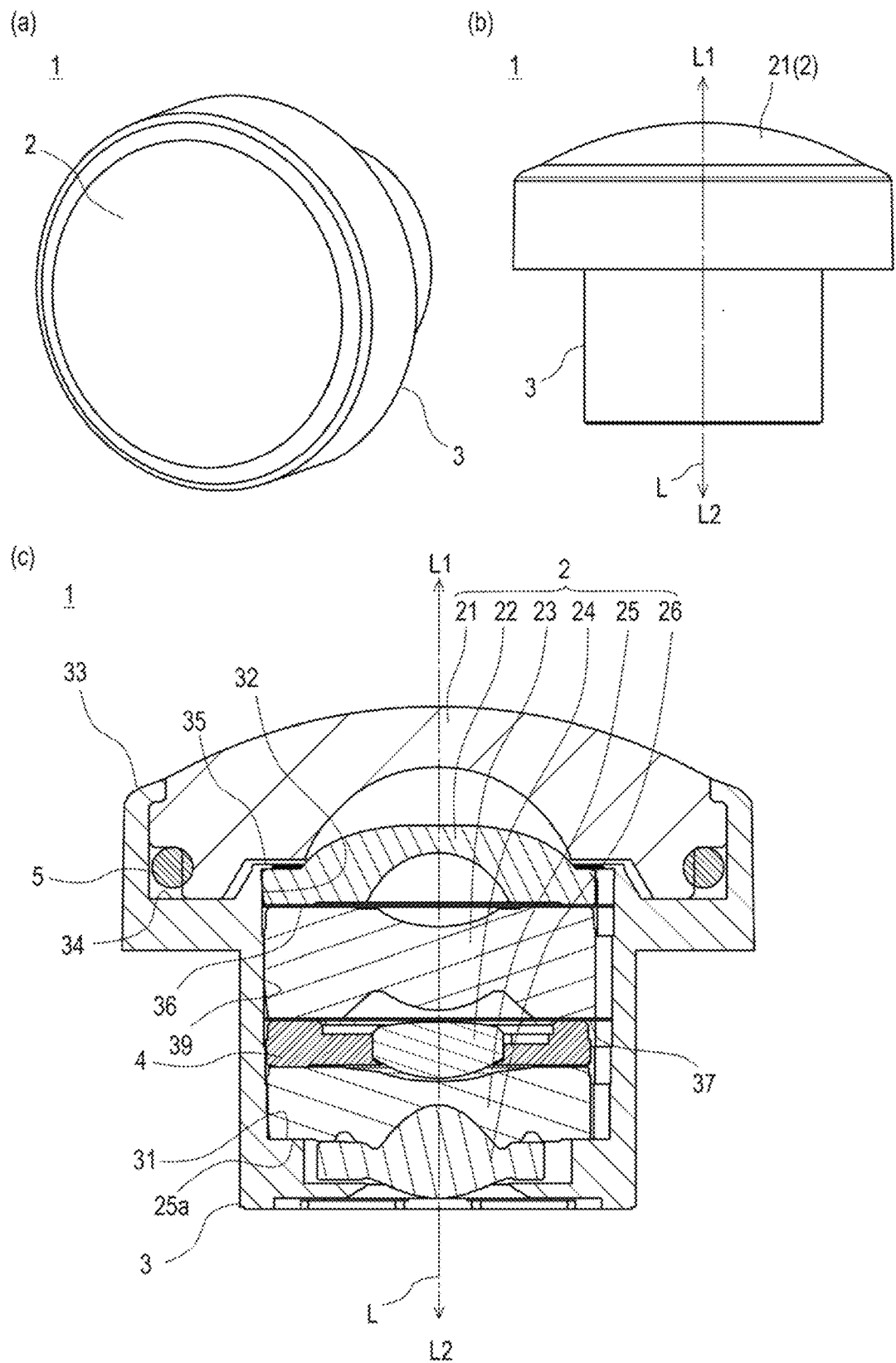
FIG. 1 is a view showing an entire lens unit in accordance with a first embodiment.
Figure 2:
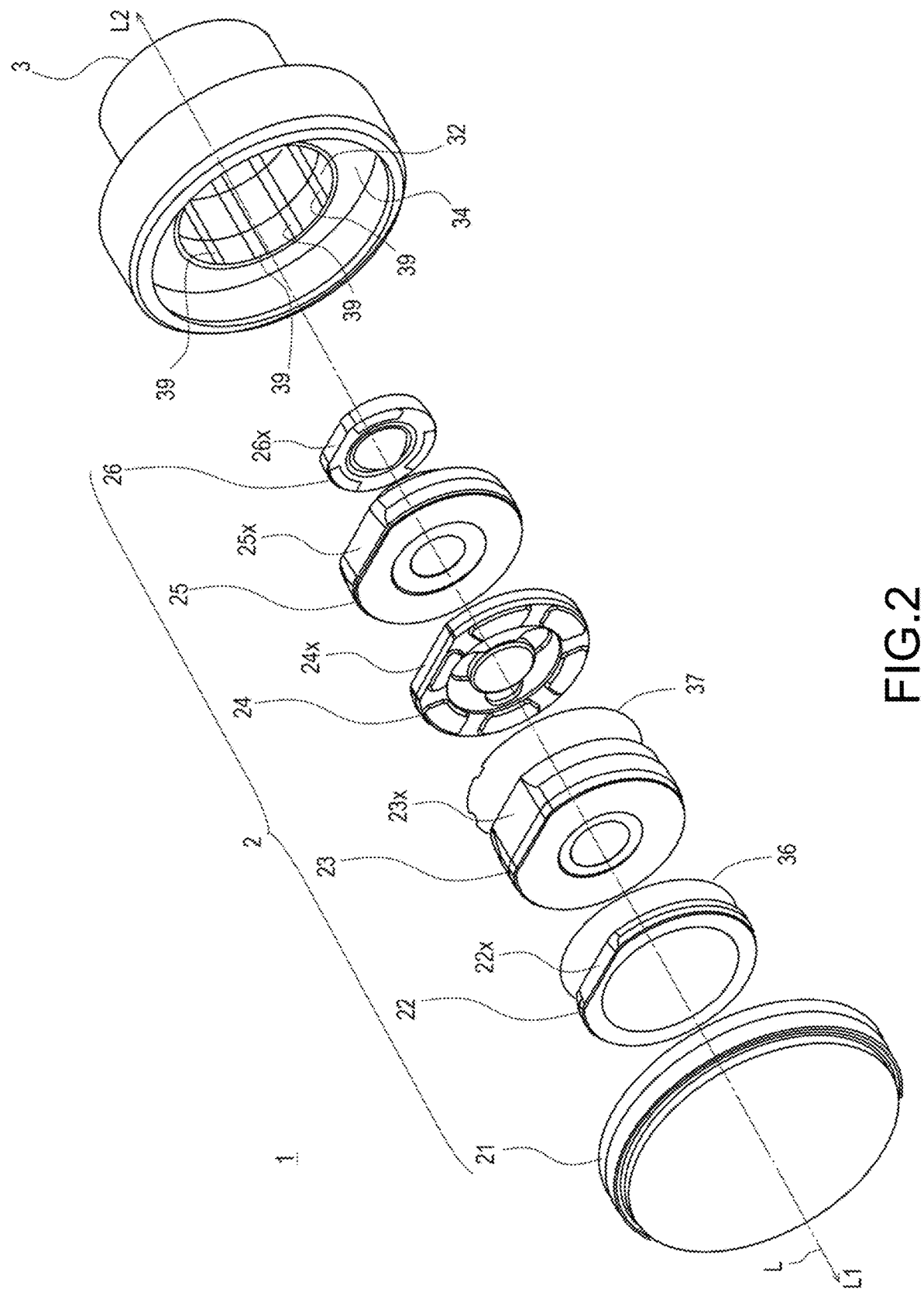
FIG. 2 is an exploded perspective view showing the lens unit in accordance with the first embodiment.

FIG. 1 is a view showing an entire lens unit 1 in accordance with this embodiment. (a) of FIG. 1 is its perspective view, (b) of FIG. 1 is its front view, and (c) of FIG. 1 is its longitudinal cross-sectional view. FIG. 2 is an exploded perspective view showing the lens unit 1.

The lens unit 1 is a lens assembly which is assembled in an on-vehicle periphery monitoring camera, a monitoring camera, a door phone and the like. An "object side "L1"" and an "image side "L2"" in the present invention are an object side and an image side in an optical axis "L" direction and an "optical axis direction" is a direction which is parallel to an optical axis "L".

(Entire Structure)

The lens unit 1 includes a wide-angle lens 2 consisting of a plurality of lenses and a lens-barrel 3 which accommodates the wide-angle lens 2. The wide-angle lens 2 is configured of six lenses, i.e., a first lens 21, a second lens 22, a third lens 23, a fourth lens 24, a fifth lens 25 and a sixth lens 26 which are disposed in a closely contacted manner from the object side "L1" toward the image side "L2" along the optical axis "L". In this embodiment, a light shielding sheet 36 which prevents light from entering to an image side is disposed between the second lens 22 and the third lens 23 in a closely contacted manner. Further, a diaphragm 37 is disposed between the third lens 23 and the fourth lens 24 (lens holder 4) in a closely contacted manner.

Among the lenses configuring the wide-angle lens 2, the first lens 21 is disposed on the most object side "L1". The second lens 22 is located on the image side "L2" of the first lens 21. The third lens 23 is located on the image side "L2" of the second lens 22. The fourth lens 24 is located on the image side of the third lens 23. The fourth lens 24 is press-fitted and fixed to the lens holder 4 made of resin and is disposed in the lens-barrel 3 in a further reinforced and fixed state by an adhesive. The fifth lens 25 is located on the image side "L2" of the fourth lens 24. The sixth lens 26 is located on the image side "L2" of the fifth lens 25. The fifth lens 25 and the sixth lens 26 configure a cemented lens.

A glass lens is used for the first lens 21 from a viewpoint that, even in a case that an object side lens face of the first lens 21 which is located on the most object side is exposed, scratches are hard to be left on the object side lens face of the first lens 21. A plastic lens is used for the second lens 22, the third lens 23, the fifth lens 25 and the sixth lens 26 from a viewpoint that workability and economical efficiency of a lens are excellent. A glass lens is used for the fourth lens 24 from a viewpoint that surface accuracy of a lens and optical characteristics such as a refractive index for temperature change are excellent.

The wide-angle lens 2 of the lens unit 1 in this embodiment is configured of six lenses. However, the number of the lenses is not limited, the material of the lens is also not limited, and it may be configured that no cemented lens is provided.

The lens-barrel 3 is a cylindrical tube-shaped lens frame made of resin and is formed with an inner circumferential surface 32 toward the image side along outer peripheral faces of the respective lenses configuring the wide-angle lens 2. The inner circumferential surface 32 is formed with a plurality of press-fitting protruded parts 39 in a protruded shape (swelled shape) to an inner side in a radial direction with equal intervals in a circumferential direction. The second lens 22, the third lens 23, the lens holder 4 and the fifth lens 25 configuring the wide-angle lens 2 are press-fitted to the press-fitting protruded parts 39 and, in addition, their outer peripheral faces are supported by the inner circumferential surface 32 of the lens-barrel 3 and thereby they are positioned in the optical axis "L" direction.

Further, a flat part 25*a* formed in a periphery of an image side face of the fifth lens 25 is placed on a ring-shaped placing face 31 which is extended to an inner side in the circumferential direction on the image side of the lens-barrel 3. Further, a periphery of a face on the object side "L1" of the second lens 22 is fixed by a caulking part 35 provided at an end part of an object side inner circumferential surface of the lens-barrel 3.

As a result, the second lens 22, the third lens 23, the lens holder 4 (fourth lens 24), the fifth lens 25 and the sixth lens 26 are positioned in the optical axis "L" direction. In addition, an O-ring 5 is assembled to an outer peripheral portion of the first lens 21 and then, the first lens 21 to which the O-ring 5 has been assembled is assembled to a ring-shaped groove part 34. After that, a periphery of the first lens 21 is fixed by a caulking part 33 provided at an end part on the object side of the lens-barrel 3. The first lens 21 is positioned in the optical axis "L" direction in this process.

In this embodiment, from a viewpoint of preventing an error of inserting order of the second lens 22, the third lens 23, the lens holder 4 (fourth lens 24), the fifth lens 25 and the sixth lens 26, the lenses are formed so that their outer diameters are reduced toward the image side "L2", and the inner circumferential surface 32 is formed narrowly so as to correspond to the outer diameters of the lenses. Further, upper side areas in FIG. 2 of the second lens 22, the third lens 23, the lens holder 4 (fourth lens 24), the fifth lens 25 and the sixth lens 26 are formed with "D"-cut parts 22*x* through 26*x*.

(Configuration of Second Lens)

Figure 3:
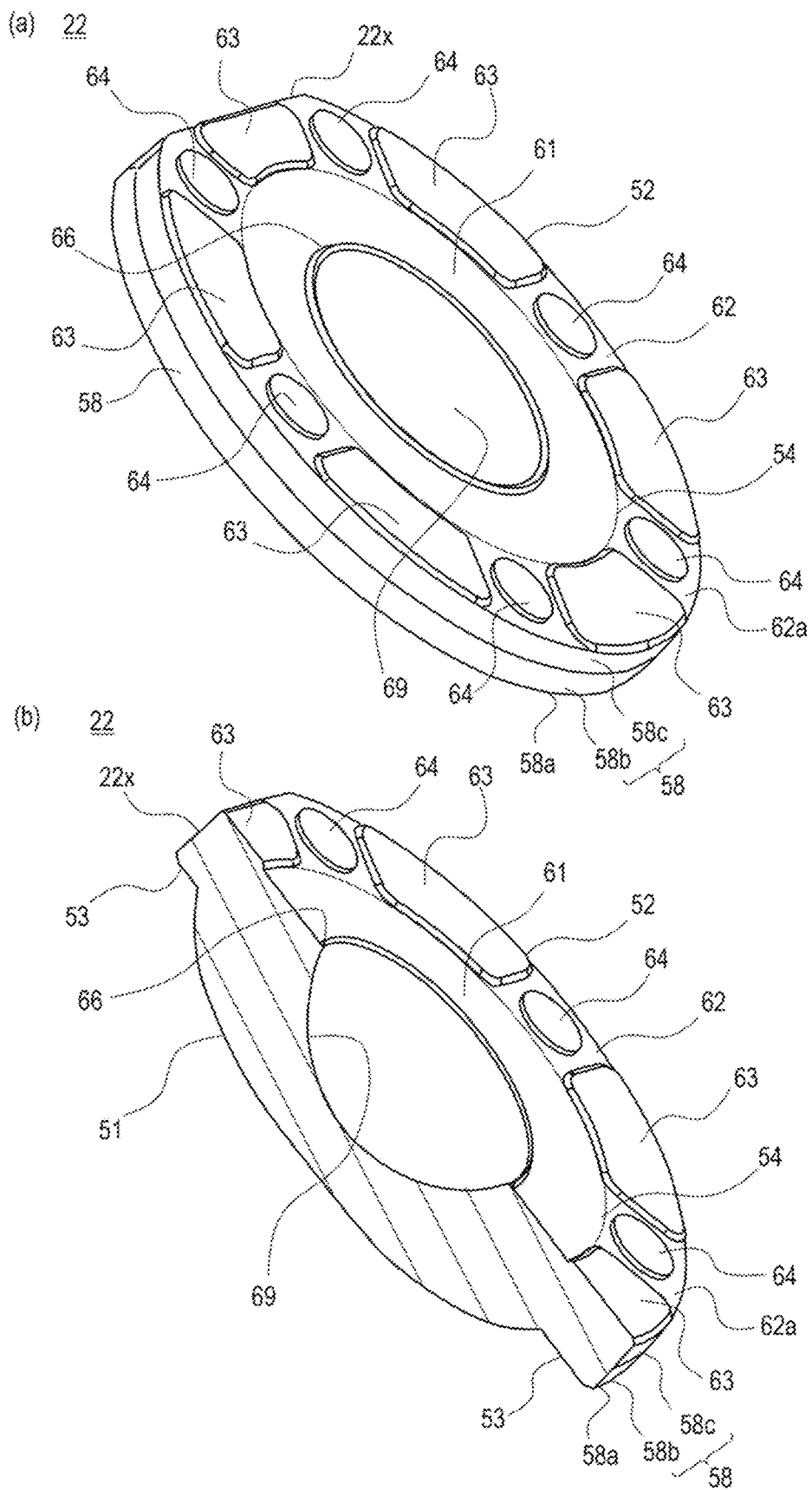
FIG. 3 is a view showing a second lens in accordance with the first embodiment.
Figure 4:
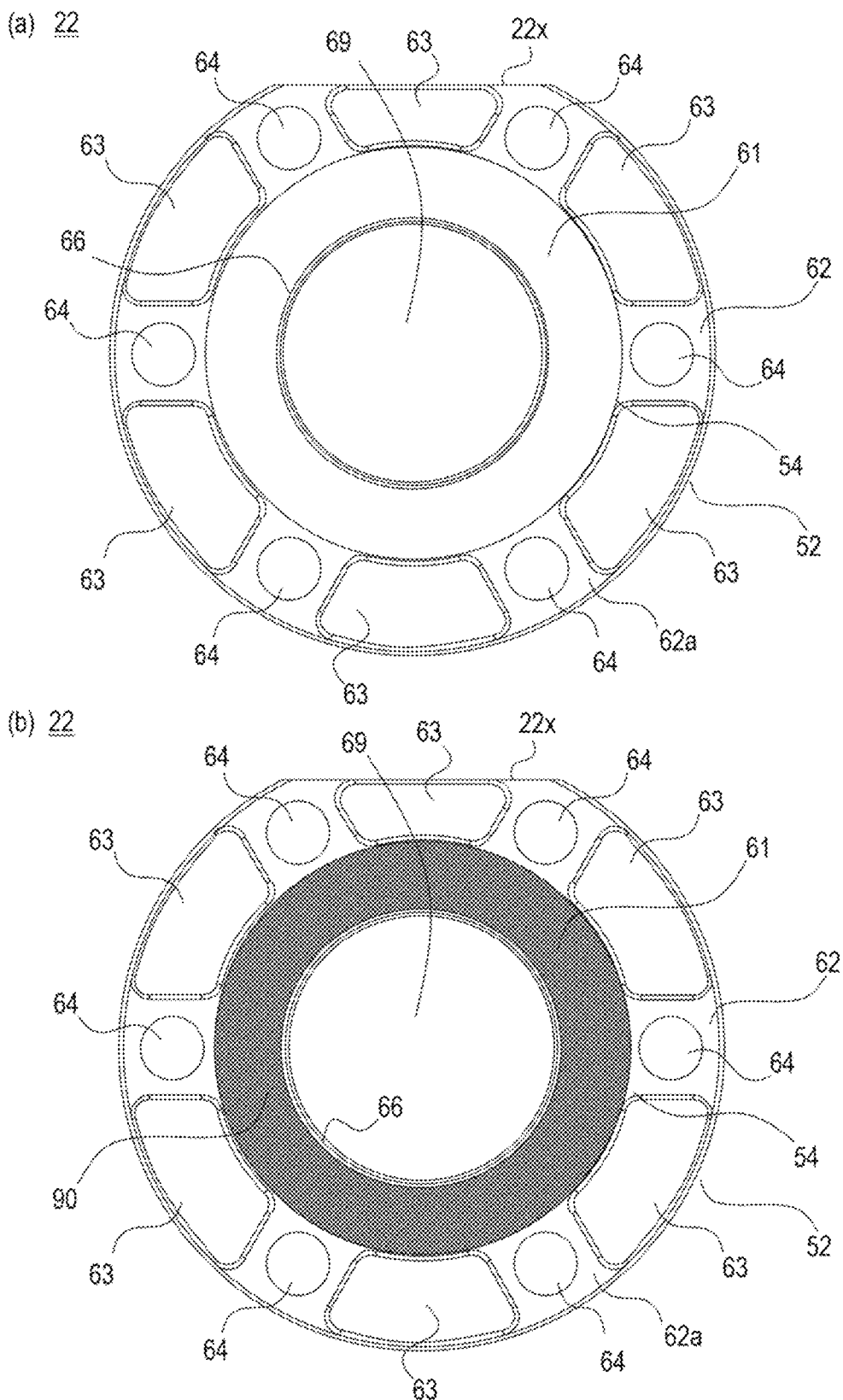
FIG. 4 is a view showing an image side face of the second lens in accordance with the first embodiment.

Next, the second lens 22 having a characteristic configuration in this embodiment will be described below. Fig. is a view showing the second lens 22. (a) of FIG. 3 shows the entire second lens 22 and (b) of FIG. 3 is a cross-sectional perspective view. FIG. 4 is a view showing the second lens 22. (a) of FIG. 4 is a plan view showing an image side "L2" face of the second lens 22 (in (c) of FIG. 1, a face on the third lens 23 side). Further, (b) of FIG. 4 shows a configuration where India ink 90 is applied to a part of the face.

In the second lens 22, the lens face is provided with a convex object side lens face 51 on the object side "L1" and a concave image side lens face 69 on the image side "L2". The second lens 22 is provided with a flange part 52 which surrounds an outer peripheral side of the lens face. In this embodiment, a part of the flange part 52 is formed to be the "D"-cut part 22*x*.

The object side "L1" of the flange part 52 is formed to be an object side flange face 53 which surrounds an outer peripheral side of the object side lens face 51, and its image side "L2" is formed to be an image side flange face 54 which surrounds the image side lens face 69. In other words, the object side "L1" face of the flange part 52 is referred to as the "object side flange face 53", and its image side "L2" face is referred to as the "image side flange face 54".

The image side flange face 54 is formed to be a slightly recessed step shape on its inner side (in other words, the image side lens face 69 side). In other words, the image side flange face 54 is provided with an image side flange face inner peripheral part 61 in a ring and groove shape and an image side flange face outer peripheral part 62 (also simply referred to as an "outer peripheral part") in a ring shape which is provided on its outer side. The image side flange face outer peripheral part 62 is provided with a positioning face 63 described below. In other words, the image side flange face 54 of the flange part 52 is provided with the positioning face 63, which is formed on the outer peripheral side and is protruded to the optical axis "L" direction, and the image side flange face inner peripheral part 61 as the first step part which is formed on the inner peripheral side with respect to the positioning face 63 and is recessed in the optical axis "L" direction with respect to the positioning face 63 (more specifically, to the object side "L1"). The image side flange face inner peripheral part 61 is coated with India ink 90. In other words, black coating is applied to the image side flange face inner peripheral part 61.

The image side flange face outer peripheral part 62 is provided with a flange face main body 62*a* as a second step part and a plurality of the positioning faces 63 in a boss shape (or protruded shape) which are protruded to the image side "L2" on the flange face main body 62*a* along its outer periphery. The positioning face 63 is closely contacted (abutted) with an object side face of the light shielding sheet 36 which is disposed between the second lens 22 and the third lens 23 to position the second lens 22 in the optical axis "L" direction. In this embodiment, the positioning face 63 is provided at six positions at an equal interval. In other words, the flange face main body 62*a* is formed as the second step part which is formed by one step higher on the outer peripheral side with respect to the image side flange face inner peripheral part 61 as the first step part and, in addition, the positioning faces 63 which are formed by one step higher are formed on the flange face main body 62*a*. The positioning face 63 of the "D"-cut part 22*x* is formed in a shape so that a part of another positioning face 63 is cut so as to correspond to the shape of the "D"-cut part 22*x*.

In the flange face main body 62*a* which is the second step part, ejector pin abutting parts 64 are formed between the positioning faces 63 adjacent to each other. In this embodiment, the ejector pin abutting part 64 is formed in a boss shape (or protruded shape) which is slightly protruded from the flange face main body 62*a*. However, a protruding amount of the ejector pin abutting part 64 is smaller than a protruding amount of the positioning face 63. In other words, the ejector pin abutting parts 64 are formed so as not to obstruct a function as a reference surface of the positioning faces 63. As described below with reference to FIG. 6, ejector pins 74 are abutted with the ejector pin abutting parts 64 when separated from a metal mold 70 at the resin molding.

The object side flange face 53 is formed on the object side "L1" at a position facing the ejector pin abutting part 64. In this embodiment, it is configured that a position facing a center position of the ejector pin abutting part 64 is set to be the object side flange face 53 and is not the object side lens face 51. In this case, the ejector pin abutting part 64 may not be limited to a configuration of a protruded shape as described above. For example, the ejector pin abutting part 64 may be provided on the same plane as the flange face main body 62*a* which is the second step part, and alternatively, the ejector pin abutting part 64 may be formed in a recessed shape with respect to the flange face main body 62*a*.

Figure 5:
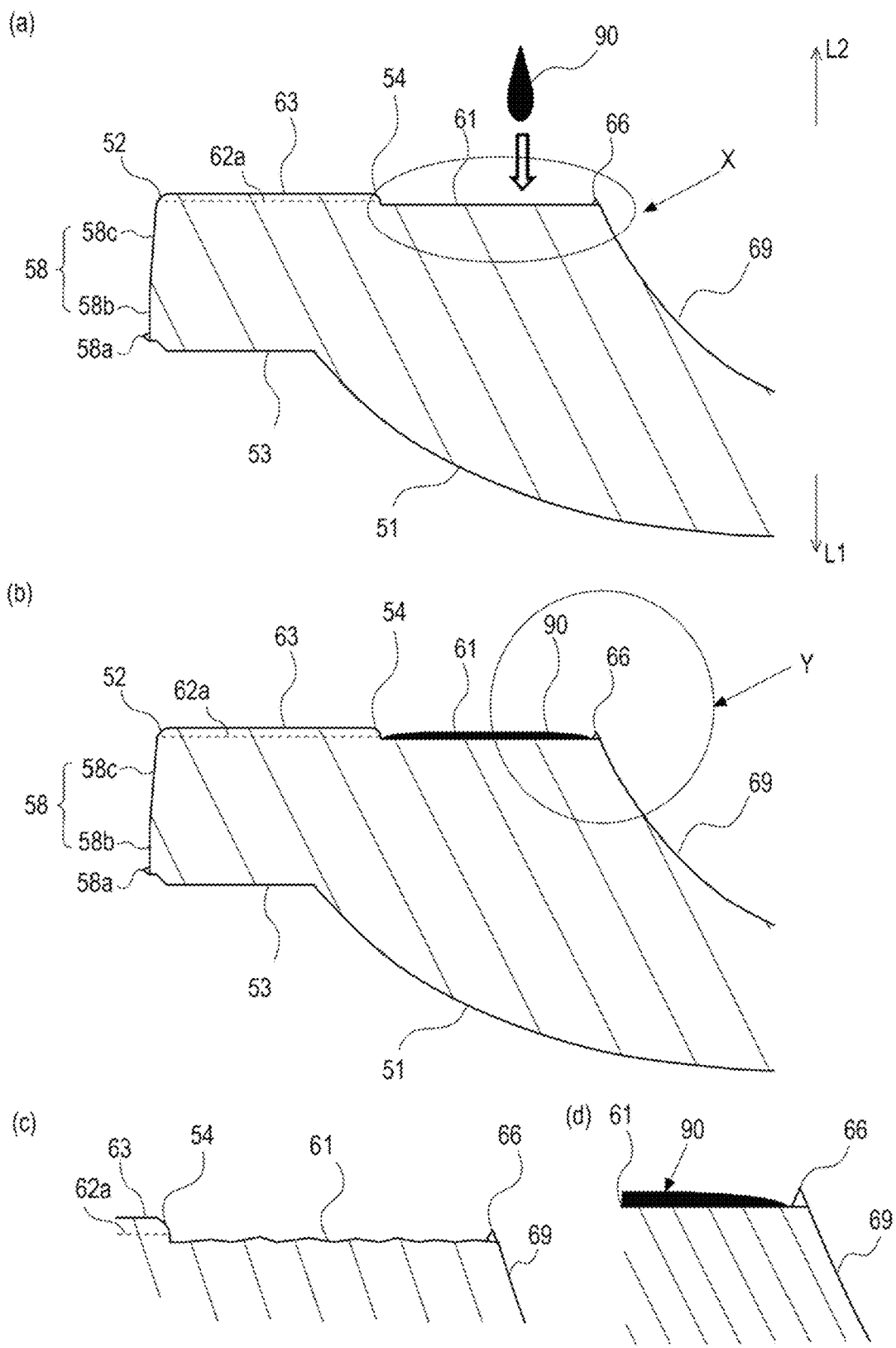
FIG. 5 is a view showing a cross-sectional configuration of a flange part of the second lens in accordance with the first embodiment.

FIG. 5 show a cross-sectional configuration of the flange part 52 of the second lens 22. These are configurations which are cut from the "D"-cut part 22*x* to a facing position. (a) of FIG. 5 shows a state before India ink 90 is applied, (b) of FIG. 5 shows a state that the India ink 90 has been applied, (c) of FIG. 5 shows an enlarged image side flange face inner peripheral part 61 in (a) of FIG. 5, and (d) of FIG. 5 shows an enlarged boundary area "Y" between the image side lens face 69 and the image side flange face inner peripheral part 61 in (b) of FIG. 5.

The image side flange face inner peripheral part 61 is slightly recessed to the object side "L1" with respect to the image side flange face outer peripheral part 62 and is applied with India ink 90 as shown in (b) of FIG. 4 and (b) of FIG. 5. The India ink 90 is applied to the image side flange face inner peripheral part 61 so as to be a black coating part and, as a result, a ghost generated through the flange part 52 of the second lens 22 can be suppressed. The India ink 90 functions to prevent light diffusion by the India ink color and, in addition, a boundary face between the image side flange face inner peripheral part 61 and air is eliminated by the India ink 90 and an inner face reflectance is reduced.

In addition, a lens side face 58 is formed with a parting line 58a at a position of parting faces of a movable mold 71 and a fixed mold 72 of a metal mold 70, which will be described with reference to the following FIG. 6, in the vicinity of an end part on the object side flange face 53 side (in this embodiment, a boundary portion with the object side flange face 53). It is ideal that the parting line 58a is not formed. However, in a so-called injection molding which utilizes a movable mold 71 and a fixed mold 72, a minute projecting shape, i.e., a minute projected part or a burr is formed.

In this embodiment, the lens side face 58 is provided with a vertical part 58b from a substantially center portion in a width direction (upper and lower direction in the drawing) to the object side flange face 53 and a tapered part 58c from the substantially center portion to the flange part 52. When the second lens 22 is to be press-fitted to the inner circumferential surface 32 of the lens-barrel 3 from the object side "L1" to the image side "L2", the second lens 22 is press-fitted from the tapered part 58c and then is press-fitted to a middle of the vertical part 58b. In other words, the parting line 58a is located on a press-fitting opposite side (object side) with respect to the press-fitted portion. In this case, the parting line 58a is formed in a boundary portion between the object side flange face 53 and the lens side face 58 and is not press-fitted. In other words, it can be prevented that the second lens 22 is distorted or displaced in the press-fitting direction due to press-fitting of the parting line 58a, or that the parting line 58a (minute projected part or burr) is peeled off to generate dust. As a result, optical performance can be prevented from being affected.

Further, as shown in (c) of FIG. 5, the image side flange face inner peripheral part 61 is formed with fine irregularities or embossing. Especially, in a case that the second lens 22 is a plastic lens, the India ink 90 may be shed and repelled and coating is not stabilized or is not made thin. However, when provided with fine irregularities, the applied India ink 90 is prevented from flowing and a proper amount can be applied to an appropriate region.

Further, mainly as shown in (d) of FIG. 5, the boundary portion between the image side flange face inner peripheral part 61 and the image side lens face 69 may be formed with a burr 66 which is projected to the image side "L2". The burr 66 is formed when the second lens 22 is molded.

Figure 6:
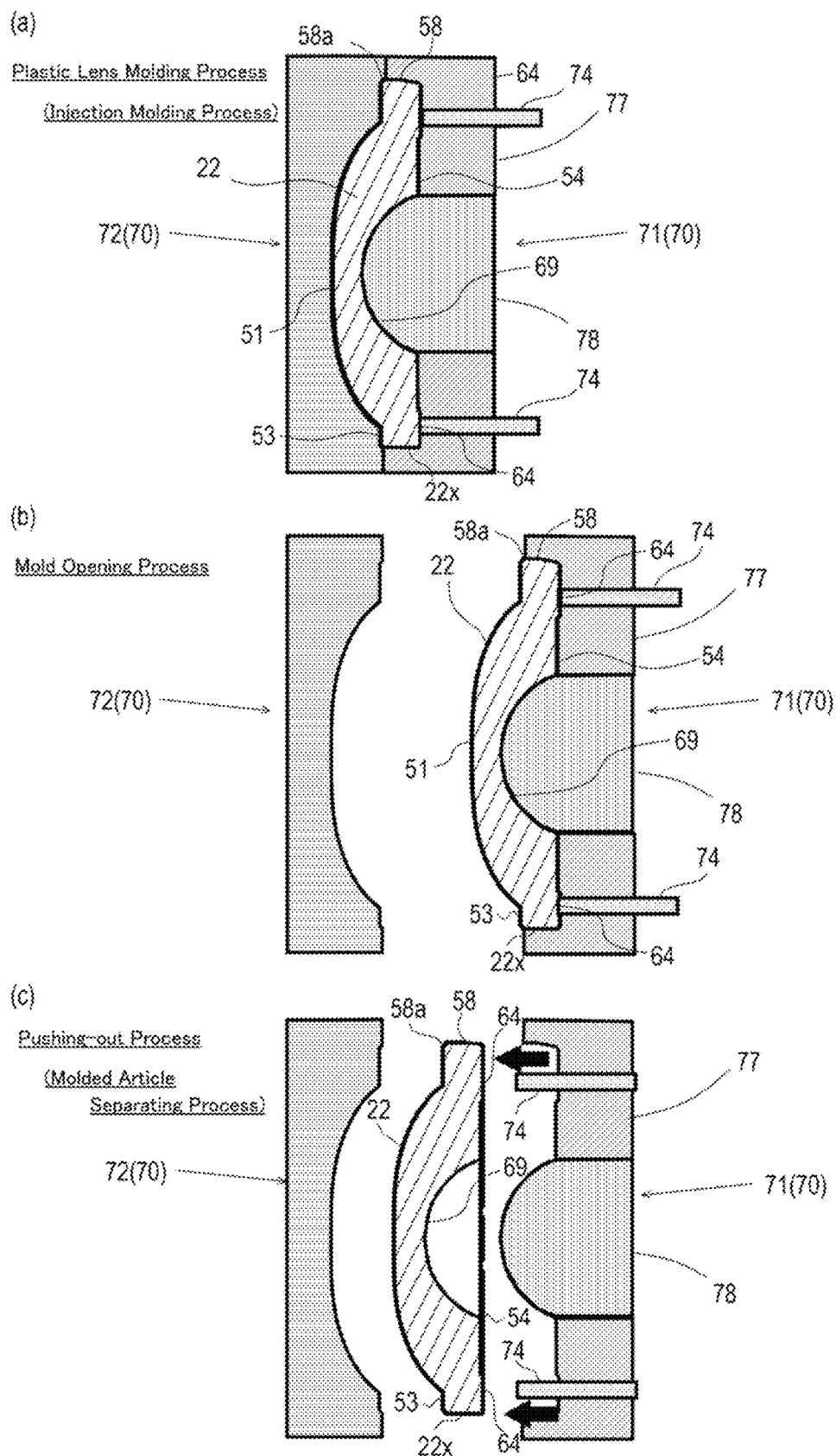
FIG. 6 is a view schematically showing a molding process of the second lens in accordance with the first embodiment.

FIGS. 6(a), 6(b) and 6(c) are views schematically showing a molding process (cross-sectional process drawing) of the second lens. The second lens 22 is manufactured by resin molding by using the metal mold 70 having the movable mold 71 and the fixed mold 72. As shown in a plastic lens molding process (injection molding process) in (a) of FIG. 6, in a state that the movable mold 71 on the right side in the drawing and the fixed mold 72 on the left side are closed, resin is injected from a gate into an inside of the metal mold 70.

The movable mold 71 and the fixed mold 72 are arranged so that a side of the image side lens face 69 and the image side flange face 54 corresponds to the movable mold 71 and a side of the object side lens face 51 and the object side flange face 53 corresponds to the fixed mold 72. Further, a boundary between the movable mold 71 and the fixed mold 72 is located at the lens side face 58 of the second lens 22. More specifically, the boundary between the movable mold 71 and the fixed mold 72, in other words, the parting faces are, as described above, located in the vicinity of an end part on the object side flange face 53 side of the lens side face 58 of the second lens 22. The parting line 58a of the second lens 22 is formed at the boundary as shown in a pushing-out process (molded article separating process) in (c) of FIG. 6. Further, a gate port is located in a portion of the "D"-cut part 22x of the lens side face 58.

As shown in a mold opening process in (b) of FIG. 6, the movable mold 71 and the fixed mold 72 are separated from each other at a timing when the resin is hardened. In this case, the second lens 22 is separated from the fixed mold 72 and is maintained in a fixed state to the movable mold 71. After that, as shown in the pushing-out process in (c) of FIG. 6, the ejector pins 74 provided in the movable mold 71 push out the second lens 22 through the ejector pin abutting parts 64 and the second lens 22 is separated from the movable mold 71.

In this case, the position where the ejector pin 74 is abutted (in other words, the ejector pin abutting part 64) is set so as to face the object side flange face 53 of the flange part 52. Therefore, an adverse influence such as distortion is not given to a shape of the lens face (especially, the object side lens face 51) due to a pushing-out operation of the ejector pin 74 for the second lens 22. Further, at the time of the plastic lens molding process, the ejector pin 74 is set in a state that the ejector pin 74 is disposed on an image side with respect to an image side flange face forming face of an image side flange face forming mold 77 for forming the image side flange face 54 and the like which are a face on the image side of the flange part 52. In other words, for example, in a case that the ejector pin 74 is set in a state that the ejector pin 74 is disposed on the object side with respect to the image side flange face forming face of the image side flange face forming mold 77 (a state that a tip end of the ejector pin 74 is protruded from the image side flange face forming face), the ejector pin abutting part 64 of the second lens 22 having been molded is formed to be a recessed shape. Therefore, at the time of a pushing-out process for pushing out the second lens 22 by the ejector pins 74, the tip ends of the ejector pins 74 are fitted to the ejector pin abutting parts 64 formed in a recessed shape and thus, the second lens 22 may be hard to be separated from the ejector pins 74 (movable mold 71). On the other hand, when the ejector pin 74 is set in a state that the ejector pin 74 is disposed on an image side with respect to the image side flange face forming face, it can be prevented that the second lens 22 is hard to be separated from the ejector pins 74 (movable mold 71).

When the second lens 22 is to be detached from the mold 70 at the time of resin molding, more specifically, when the second lens 22 is to be detached from the movable mold 71 by the ejector pins 74, the burr 66 as described above may be formed in a ring shape at a boundary between the image side lens face 69 and the image side flange face inner peripheral part 61. The burr 66 is a minute ring-shaped projected part which is formed by resin injected between an image side lens face forming mold 78 forming the image side lens face 69 and the image side flange face forming mold 77 forming the image side flange face 54 and the like. When India ink 90 is applied, as shown in (d) of FIG. 5, the India ink 90 can be prevented from flowing to the image side lens face 69 by the burr 66. In this embodiment, a projecting amount of the burr 66 is about several µm. Further, arrangement of the image side lens face forming mold 78 and the image side flange face forming mold 77 may be modified further precisely so that the burr 66 is not formed.

Further, since the image side flange face inner peripheral part 61 is formed so as to be located on the object side in the optical axis "L" direction with respect to the positioning face 63, the position in the optical axis direction of the second lens 22 is prevented from varying due to thickness of the India ink 90 by black coating. Therefore, degradation of the optical performance can be prevented. In this embodiment, the thickness of India ink 90 is about 30 µm at the maximum. Therefore, a distance from the image side flange face inner peripheral part 61 to a tip end of the positioning face 63 may be set about 50 µm, and naturally, the distance may be adjusted depending on a thickness of the India ink 90 which is applied.

The features of this embodiment described above will be briefly summarized as follows.

Since the flange part 52 is utilized for taking out the second lens 22 from the metal mold 70, when the second lens 22 is to be pushed out from the metal mold and separated from the metal mold by the ejector pins 74, the second lens 22 (especially, a lens face) which is a plastic lens can be restrained from distorting. Further, influence to the black coating can be prevented. For example, a portion which is pushed by the ejector pin 74 is formed with a minute protruded part and thus, when black coating is applied to the outer peripheral part, unevenness or peeling of India ink 90 may occur. However, according to this embodiment, the outer peripheral part which is a portion pushed by the ejector pin 74 and the black coating part which is a portion applied with black coating are separately provided and thus, occurrence of such malfunction can be prevented.

Further, a boundary between the movable mold 71 and the fixed mold 72 is set on an opposite side in a press-fitting direction with respect to a portion of the second lens 22 which is press-fitted to the lens-barrel 3. Therefore, the parting line 58a is formed on the object side "L1" with respect to the press-fitted portion. The second lens 22 is press-fitted from the object side "L1" of the lens-barrel 3 toward the image side "L2" and thus, even in a case that a minute projected part has been formed in the parting line 58a, malfunction due to the projected part at the time of press-fitting (distortion or axial deviation of the second lens 22) can be restrained.

An area with which the ejector pin 74 is abutted, in other words, an opposite side to the portion where the ejector pin 74 pushes is not the object side lens face 51 but the object side flange face 53 of the flange part 52 and thus, adverse influence to the object side lens face 51 can be eliminated.

Second Embodiment

Figure 7:
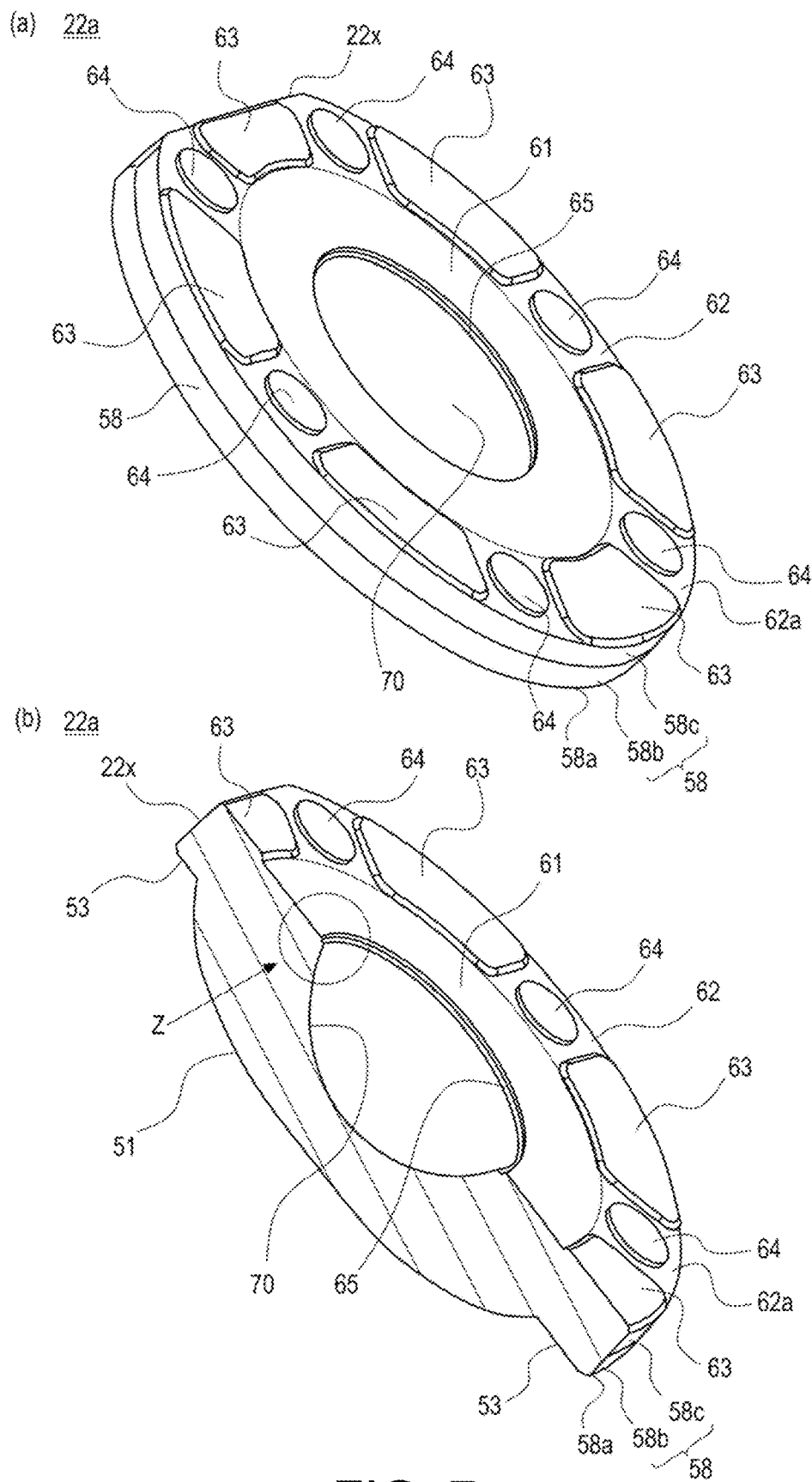
FIG. 7 is a view showing a second lens in accordance with a second embodiment.
Figure 8:
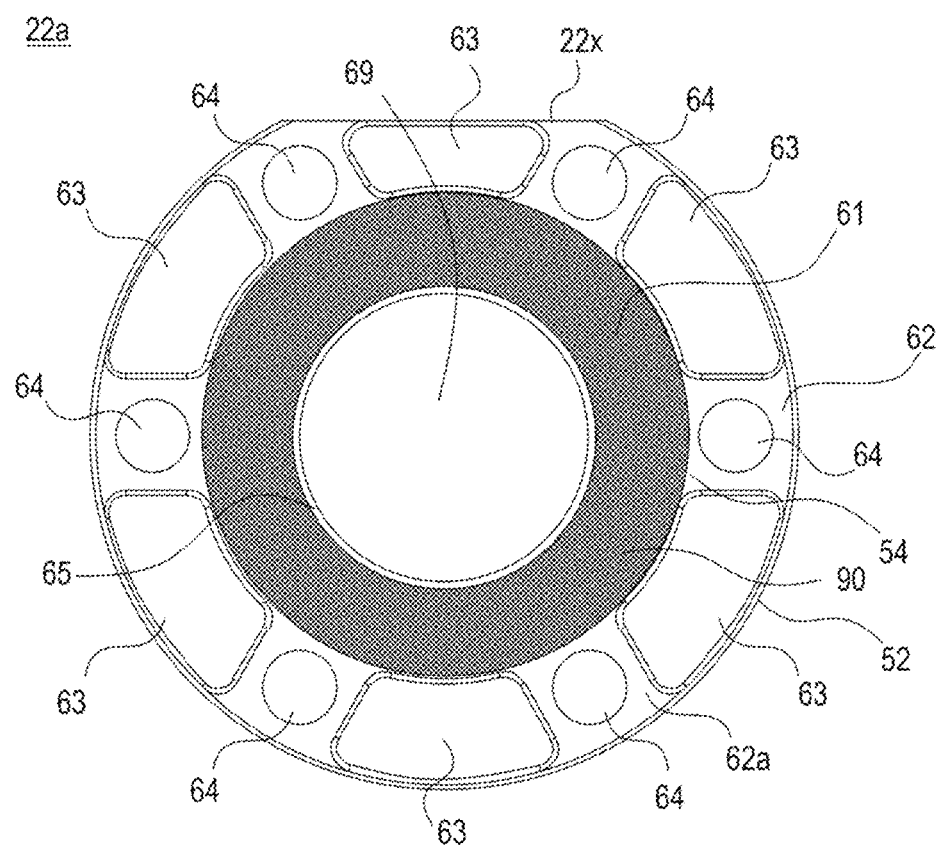
FIG. 8 is a view showing an image side face of the second lens in accordance with the second embodiment.
Figure 9:
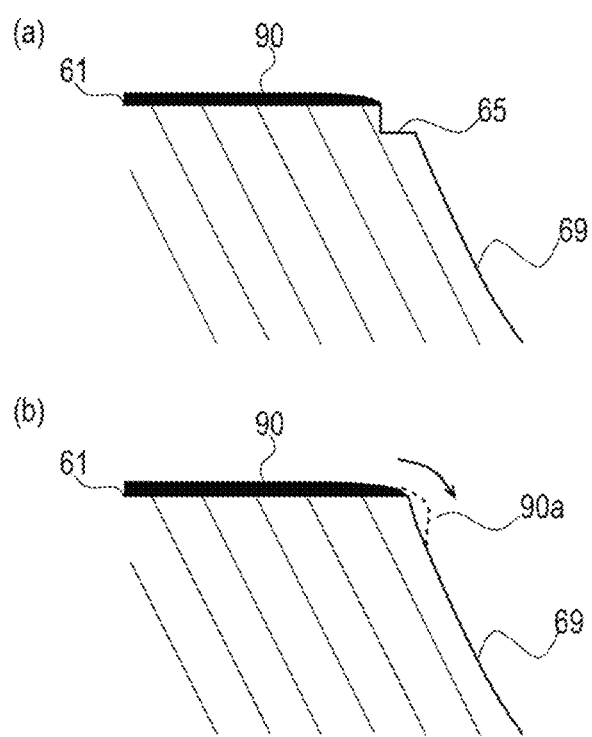
FIG. 9 is an enlarged view showing a boundary portion between an image side flange face inner peripheral part and an image side lens face in accordance with the second embodiment.

A second lens 22a in a second embodiment will be described below with reference to FIGS. 7 through 9. In the second lens 22a in this embodiment, a shape of a boundary portion between the image side flange face inner peripheral part 61 and the image side lens face 69 is different from the shape in first embodiment. In the following descriptions, portions different from the first embodiment will be mainly described and descriptions of similar configurations and functions are appropriately omitted. FIG. 7 is a view showing a second lens 22a. (a) of FIG. 7 shows the entire second lens 22a and (b) of FIG. 7 is its cross-sectional perspective view. FIG. 8 is a plan view showing a face on the image side "L2" of the second lens 22a. FIG. 9 is an enlarged view showing a boundary portion (area "Z" in FIG. 7) between an image side flange face inner peripheral part 61 and an image side lens face 69. (a) of FIG. 9 shows a state that India ink 90 is applied, and (b) of FIG. 9 shows a state that India ink 90 is applied to a configuration which is not formed with a third step part 65. This embodiment is a case that precision of the above-mentioned metal mold 70 (especially, arrangement of the image side lens face forming mold 78 and the image side flange face forming mold 77) is improved and a burr 66 is not formed in a boundary of the image side flange face inner peripheral part 61.

A boundary portion between the image side flange face inner peripheral part 61 and the image side lens face 69 is formed with a third step part 65 in a shape recessed to the object side in the optical axis direction. In other words, the third step part 65 is formed in a step shape so that a ring-shaped step is recessed to the object side by one step in the optical axis direction. More specifically, the third step part 65 is a step part which is recessed at a substantially right angle (90 degrees) from the image side flange face inner peripheral part 61.

In comparison with a configuration that the third step part is not formed in a boundary portion between the image side flange face inner peripheral part 61 and the image side lens face 69 as shown in (b) of FIG. 9, in a configuration that the third step part 65 as shown in (a) of FIG. 9 is formed, an edge is provided in the boundary portion between the image side flange face inner peripheral part 61 and the image side lens face 69. Therefore, the surface tension of the India ink 90 is easily generated and thus, the India ink 90 applied to the image side flange face inner peripheral part 61 can be prevented from spreading to the image side lens face 69 (India ink 90a shown by the broken line) as shown in (b) of FIG. 9.

Although the present invention has been shown and described with reference to a specific embodiment. However, this embodiment is only an example and various changes and modifications will be apparent to those skilled in the art from the teachings herein and it will be understood that many modifications may be made without departing from the spirit of the present invention.

What is claimed is:

1. A manufacturing method of a plastic lens which is to be press-fitted from an object side of a lens-barrel toward an image side and is held, the plastic lens being formed by using a metal mold comprising a fixed mold and a movable mold, the plastic lens comprising a lens face and a flange part surrounding the lens face, and an image side face of the flange part comprising a black coating part and an outer peripheral part which is formed on an outer peripheral side with respect to the black coating part, the manufacturing method comprising:

a plastic lens molding process in which the plastic lens is molded by using the fixed mold for molding an object side lens face of the plastic lens and the movable mold for molding an image side lens face and the flange part of the plastic lens;

a mold opening process in which the metal mold is opened by moving the movable mold after the plastic lens molding process; and a pushing-out process in which the outer peripheral part is pushed out by an ejector pin which is disposed in the movable mold at a time when the mold opening process is performed or, after the mold opening process has been performed, wherein the outer peripheral part where the ejector pin is to be abutted comprises ejector pin abutting parts in a protruded shape which are protruded to the image side.

2. The manufacturing method of a plastic lens according to claim 1, wherein parting faces between the movable mold and the fixed mold are set so as to be located on the object side with respect to a portion of the plastic lens which is press-fitted to the lens-barrel.

3. The manufacturing method of a plastic lens according to claim 2, wherein at least a part of an area of the outer peripheral part where the ejector pin is to be abutted and an object side face of the flange part are overlapped along an optical axis direction.

4. The manufacturing method of a plastic lens according to claim 1, wherein in the plastic lens molding process, the ejector pin is set in a state that the ejector pin is disposed on the image side with respect to an image side flange face forming face of an image side flange face forming mold for forming an image side face of the flange part.

5. The manufacturing method of a plastic lens according to claim 1, wherein
the outer peripheral part comprises a plurality of positioning faces which are protruded to the image side, and
an area where the ejector pin is to be abutted is provided between the positioning faces adjacent to each other in the plurality of the positioning faces.

6. The manufacturing method of a plastic lens according to claim 1, wherein at least a part of an area of the outer peripheral part where the ejector pin is to be abutted and an object side face of the flange part are overlapped along an optical axis direction.

* * * * *